United States Patent
Griffin et al.

(10) Patent No.: US 11,572,178 B1
(45) Date of Patent: Feb. 7, 2023

(54) AIRCRAFT PASSENGER SEAT OXYGEN SYSTEM

(71) Applicant: AIRBUS AMERICAS, INC., Herndon, VA (US)

(72) Inventors: Mark Griffin, Elberta, AL (US); Jonathan Adiong, Spanish Fort, AL (US); Joyce Tan, Spanish Fort, AL (US)

(73) Assignee: Airbus Americas, Inc., Herndon, VA (US)

( * ) Notice: Subject to any disclaimer, the term of this patent is extended or adjusted under 35 U.S.C. 154(b) by 0 days.

(21) Appl. No.: 17/448,636

(22) Filed: Sep. 23, 2021

(51) Int. Cl.
B64D 11/06 (2006.01)
A62B 25/00 (2006.01)

(52) U.S. Cl.
CPC ........ B64D 11/0632 (2014.12); A62B 25/005 (2013.01); B64D 11/0646 (2014.12)

(58) Field of Classification Search
CPC ............ B64D 11/0629; B64D 11/0632; B64D 11/0646; B64D 2231/025; A62B 25/005
See application file for complete search history.

(56) References Cited

U.S. PATENT DOCUMENTS

| | | | |
|---|---|---|---|
| 3,981,300 A | | 9/1976 | Williams |
| 4,681,602 A | | 7/1987 | Glen et al. |
| 5,154,374 A | * | 10/1992 | Beroth ............... B64D 11/0629 244/141 |
| 5,984,415 A | * | 11/1999 | Schumacher ...... B64D 11/0646 297/217.3 |
| 7,434,766 B2 | | 10/2008 | Pozzi et al. |
| 9,016,279 B2 | | 4/2015 | Guering |
| 2002/0189617 A1 | * | 12/2002 | Cordero ................. B64D 11/00 128/205.25 |
| 2005/0116101 A1 | * | 6/2005 | Pozzi ................. B64D 11/0629 244/118.5 |

FOREIGN PATENT DOCUMENTS

| | | |
|---|---|---|
| DE | 3719105 A1 | 12/1988 |
| FR | 2753170 A1 | 9/1996 |
| WO | 2005047104 A2 | 5/2005 |

* cited by examiner

Primary Examiner — Richard G Davis
(74) Attorney, Agent, or Firm — Sterne, Kessler, Goldstein & Fox P.L.L.C.

(57) ABSTRACT

An onboard oxygen system for aircraft includes an oxygen source, a regulator connected to the oxygen source, and an oxygen mask connected to the regulator. The oxygen source is stored in a cavity in a passenger seat armrest. The oxygen mask is stored in a mask storage compartment attached to the armrest. The oxygen mask is deployed for use through an opening in the mask storage compartment.

19 Claims, 6 Drawing Sheets

AIRCRAFT PASSENGER SEAT OXYGEN SYSTEM

BACKGROUND

Field

The present disclosure relates to systems for providing oxygen to occupants onboard an aircraft. More specifically, aspects of the present disclosure relate to oxygen systems integrated into interior portions of an aircraft, including passenger seats and passenger seat armrests.

Background

Oxygen systems are a required system on many different aircraft, and in particular those aircraft that operate at higher altitudes. Pressurized aircraft allow passenger and crew to forgo receiving supplemental oxygen when the aircraft is above a certain altitude. However, these aircraft still require oxygen systems that can be deployed in case of a failure of the pressurization system. In many cases, the oxygen system is stored in the ceiling of the aircraft cabin. In these instances, the ceiling must be lowered to provide sufficient space for the oxygen system, which reduces the vertical height of the cabin, cabin volume, and passenger comfort. Thus, there exists a need to reposition the oxygen system to improve cabin volume while still maintaining accessibility of the oxygen to passengers.

BRIEF SUMMARY

An aspect of an armrest for an airplane passenger seat includes an armrest frame connected to the airplane passenger seat at a first end of the armrest frame having a cavity in its interior area; a mask storage compartment coupled to the armrest frame; an oxygen source in the cavity; and an oxygen mask positioned in the mask storage compartment. The oxygen mask is fluidly connected to the oxygen source, and an actuator is disposed in the armrest to deploy the oxygen mask to extend from the armrest frame.

An aspect of an armrest for a passenger seat of an airplane includes an armrest frame removably connected to the passenger seat, the armrest frame having a cavity in its interior area; an oxygen source disposed in the cavity in the armrest; a mask storage compartment attached to a first end of the armrest; an oxygen mask in the mask storage compartment, wherein the oxygen mask is fluidly connected to the oxygen source with tubing; an activation device connected to the oxygen source and to the oxygen mask that activates a flow of oxygen to the oxygen mask when the mask is moved from the mask storage compartment; and an actuator disposed in the armrest to deploy the oxygen mask from the mask storage compartment.

Implementations of any of the techniques described above can include a system, a method, a process, a device, and/or an apparatus. The details of one or more implementations are set forth in the accompanying drawings and the description below. Other features will be apparent from the description and drawings, and from the claims.

Further features and advantages of the disclosure, as well as the structure and operation of various aspects of the disclosure, are described in detail below with reference to the accompanying drawings. It is noted that the disclosure is not limited to the specific aspects described herein. Such aspects are presented herein for illustrative purposes only. Additional aspects will be apparent to persons skilled in the relevant art(s) based on the teachings contained herein.

BRIEF DESCRIPTION OF THE DRAWINGS

The accompanying drawings, which are incorporated herein and form a part of the specification, illustrate the aspects and, together with the description, further serve to explain the principles and to enable a person skilled in the relevant art(s) to make and use the aspects. Objects and advantages of illustrative, non-limiting aspects will become more apparent by describing them in detail with reference to the attached drawings.

DETAILED DESCRIPTION

Aspects of the present disclosure are described in detail with reference to aspects thereof as illustrated in the accompanying drawings. References to "one aspect," "an aspect," "some aspects," etc., indicate that the aspect(s) described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

Spatially relative terms, such as "beneath," "below," "lower," "above," "on," "upper," "opposite" and the like, may be used herein for ease of description to describe one element or feature's relationship to another element(s) or feature(s) as illustrated in the figures. The spatially relative terms are intended to encompass different orientations of the device in use or in operation in addition to the orientation depicted in the figures. The apparatus may be otherwise oriented (e.g., rotated 90 degrees or at other orientations) and the spatially relative descriptors used herein may likewise be interpreted accordingly.

The following examples are illustrative, but not limiting, of the present aspects. Other suitable modifications and adaptations of the variety of conditions and parameters normally encountered in the field, and which would be apparent to those skilled in the art, are within the spirit and scope of the disclosure.

As discussed above, oxygen systems are required onboard many aircraft. These systems must be accessible to aircraft occupants to dispense oxygen when required during flight operations. Aircraft oxygen systems onboard larger passenger are typically integrated into the cabin ceiling. But, as explained above, this reduces available cabin height because the ceiling must be lowered to accommodate the oxygen system. Aspects of the present disclosure seek to improve cabin height and volume by integrating the oxygen system in alternative locations in the aircraft cabin.

An aspect of an armrest for an airplane passenger seat includes an armrest frame connected to the airplane passenger seat at a first end of the armrest frame having a cavity in its interior area; a mask storage compartment coupled to the armrest frame; an oxygen source in the cavity; and an oxygen mask positioned in the mask storage compartment. The oxygen mask is fluidly connected to the oxygen source, and an actuator is disposed in the armrest to deploy the oxygen mask to extend from the armrest frame.

Some benefits of this system include increased available cabin height and volume created by moving the oxygen system into previously underutilized space (i.e., the armrest). Specifically, the space above the cabin ceiling previously used for the oxygen system can be used to raise the cabin ceiling height and/or to increase the size of the overheard storage bins, for example. A further benefit of this system is improved ease of access to the oxygen system for maintenance or replacement primarily due to the modular nature of the armrest discussed below.

Figure 1:
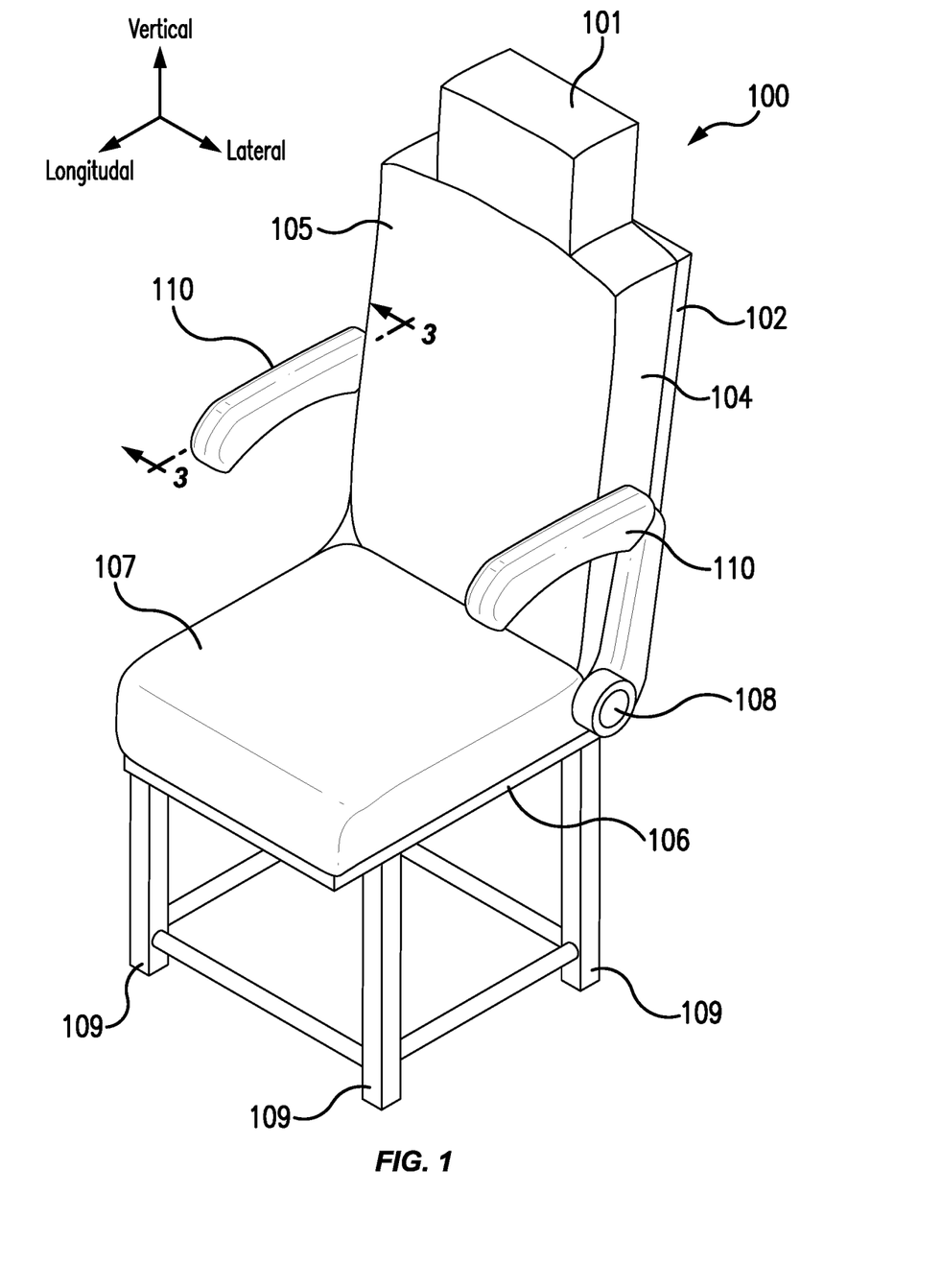
FIG. 1 is a perspective view of a passenger seat according to aspects of the present disclosure.

As shown in FIG. 1, a passenger seat 100 has a seat frame 102 that provides the required structural support for passenger seat 100. Seat frame 102 includes a seat back 104 connected to a seat bottom 106. Seat back 104 supports the back of a seated user and can include a seat back cushion 105. Seat bottom 106 forms a sitting support surface of passenger seat 100 and can include a seat bottom cushion 107. A headrest 101 can be attached to an upper portion of seat back 104. In some aspects, seat back 104 and seat bottom 106 are connected by a recline mechanism 108 that allows the angle formed between seat back 104 and seat bottom 106 to be adjusted by a user. Legs 109 are connected to seat frame 102 and extend downwards to contact a support surface (e.g., a cabin floor) to support passenger seat 100. Legs 109 are designed to orient seat frame 102 such that seat bottom 106 is approximately parallel to the support surface. Seat back 104 extends upwards at a near-vertical angle from seat bottom 106. The angle formed between seat back 104 and seat bottom 106 that can be adjusted through use of recline mechanism 108 in applicable aspects. Passenger seat 100 can be designed to comply with applicable safety regulations such as mandatory structural requirements for crashworthiness.

Figure 2:
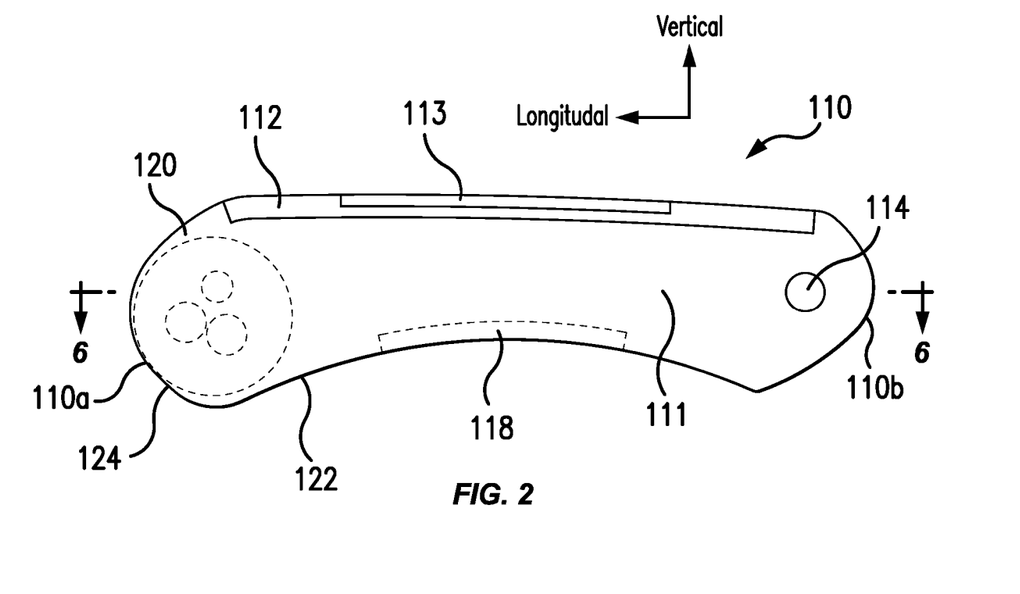
FIG. 2 is a side view of an arm rest according to aspects of the present disclosure.
Figure 3:
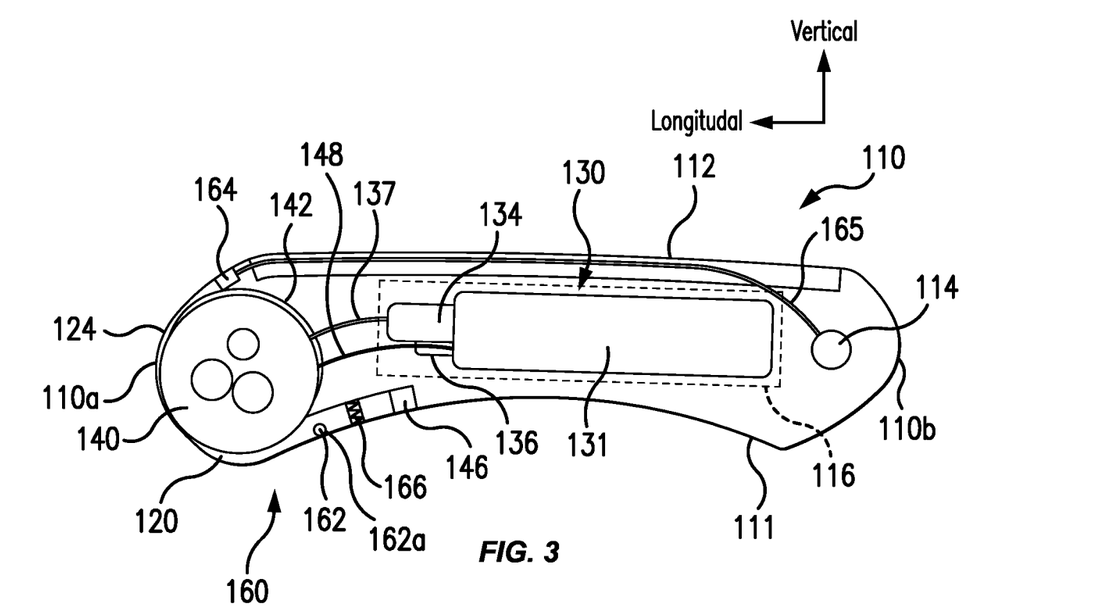
FIG. 3 is a cross section of an armrest along line 3-3 in FIG. 1, according to aspects of the present disclosure.

Passenger seat 100 can include one or more passenger armrests 110 that are each designed to support an arm of a seated user. For example, there may be two passenger armrest 110, one for each side in the lateral direction of passenger seat 100 as shown in FIG. 1. Passenger armrest 110 can be connected to a side of seat back 104 at a predetermined height above seat bottom 106 that is determined based on user comfort. A second armrest 110 can be connected to the other side of seat back 104 at the predetermined height. As shown in FIGS. 2 and 3, an aspect of armrest 110 is constructed from an armrest frame 111. An armrest cover 112 that is connected to an upper portion of armrest frame 110 can be added to increase user comfort but is not necessary. Armrest frame 111 can be constructed as a hollow structure that is either a single, integrated element or a series of portions that are assembled together. An aspect of armrest frame 111 can have a rectangular cross section when viewed from the longitudinal direction. Other aspects of armrest frame 111 can have circular, triangular, or oval cross sections. In an aspect, armrest cover 112 is disposed over the open top of armrest frame 111 to form an enclosed armrest 110. In another aspect, armrest frame 110 forms is fully enclosed (i.e., it has a top surface) because, for example, it is shaped as a tubular frame, and thus there is no armrest cover 112 attached to armrest frame 111. In an aspect, armrest cover 112 and armrest frame 111 are removably joined through the use of appropriate fasteners. In another aspect, armrest cover 112 and armrest frame 111 are permanently joined using suitable techniques such as welding or adhesives. In another aspect, armrest cover 112 and armrest frame 111 are formed as a single, integrated element using a suitable forming process such as molding or machining. Armrest cover 112 also forms the surface used to support the arm of the user when they place their arm on armrest 110. In any of the above aspects, the upper or supporting surface of armrest cover 112 may be formed with a cushion 113 for improved user comfort.

Passenger seat 100 and its associated elements may be made from any suitable material. For example, seat frame 102, armrest frame 111, and armrest cover 112 may be constructed from metals such as aluminum and steel, plastics, and composite materials. Seat frame 102 can be constructed from multiple elements that are joined together in any suitable manner such as welding, adhesive joining, and mechanical fastening using screws or bolts, for example. Seat cushions 105 and 107, and armrest cushion 113 can be formed from any suitable cushioning material such as foam or rubber materials. In some aspects, cushions 105, 107, and 113 may be formed using a multipart construction where a cushioning material such as a foam is covered with a covering material such as a fabric or leather material.

Also shown in FIGS. 2 and 3 is a connection 114 used to connect passenger armrest 110 to seat back 104. Connection 114 can be positioned adjacent a proximal end 110b of armrest 110. In some aspects, this connection 114 is a hinge that allows passenger armrest 110 to be rotated with respect to set back 104, which can improve access to passenger seat 100 for a user. For example, hinged connection 114 can comprise a cylindrical pivot pin 115 disposed on seat frame 102 that fits into a corresponding opening 117 in armrest 110. Connection 114 can be configured to limit the rotation of passenger armrest 110 to a certain angular range with respect to seat back 104 to ensure that armrest 110 cannot rotate into an undesirable position. In some aspects, connection 114 can permit armrest 110 to be detachably attached to seat frame 102 such that the entire armrest 110 assembly can be removed from seat back 104. This can be accomplished through the use of fasteners (e.g., bolts or screws). As discussed below, the removability of the entire passenger armrest 110 enables the modular benefits of aspects of passenger armrest 110.

Figure 4:
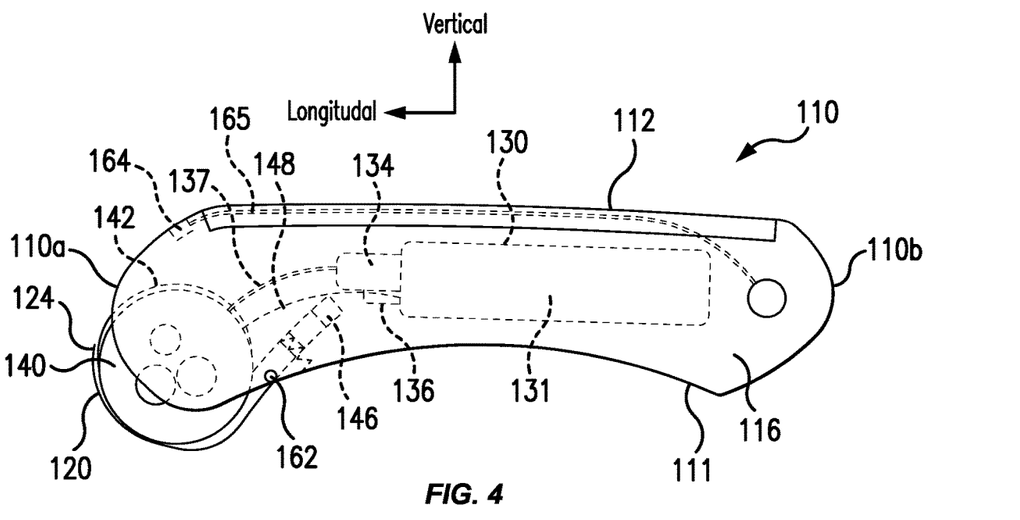
FIG. 4 is a cross section of an armrest with a mask storage compartment in a deployed configuration according to aspects of the present disclosure.
Figure 5:
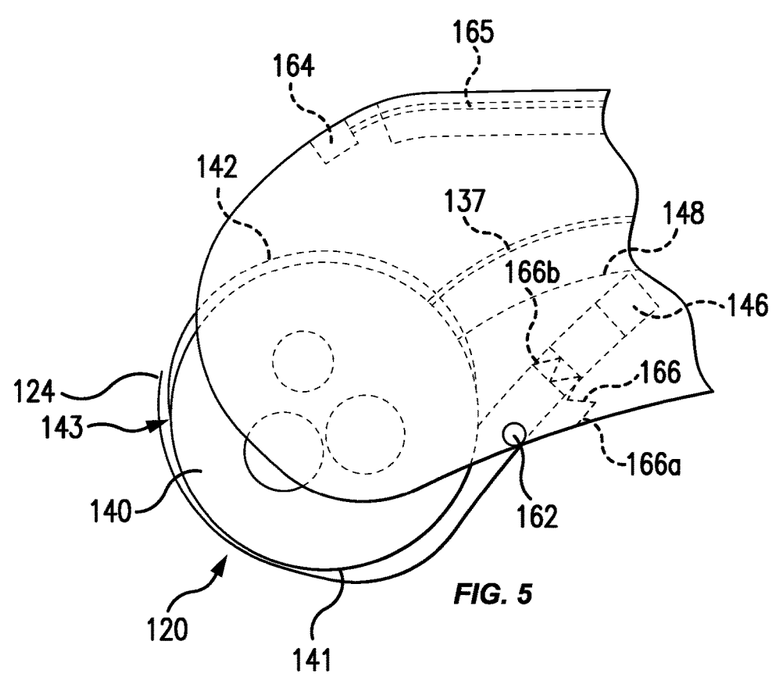
FIG. 5 is a cross section of a mask storage compartment in a deployed configuration according to aspects of the present disclosure.

Armrest 110 includes a mask storage compartment 120. In an aspect, mask storage compartment 120 can be disposed at a distal end 110a of armrest 110. As shown in FIGS. 3-5, an aspect of mask storage compartment 120 has a substantially cylindrical housing 122 that forms the distal end of armrest 110 such that the axis of cylindrical housing 122 is oriented in the lateral direction (i.e., the axis of housing 122 is perpendicular to the long axis of armrest 110 that is oriented parallel to the longitudinal direction). In other aspects, mask storage compartment 120 can be formed in any suitable shape, including cubic, ovoid, or ellipsoid shapes. Mask storage compartment 120 can be formed as an integral part of armrest 110 (e.g., as part of cavity 116), or it can be formed separately and joined to distal end 110b of armrest 110 through the use of, for example, welding, fasteners, or adhesives. Additional features of mask storage compartment 120 will be discussed below.

Figure 6:
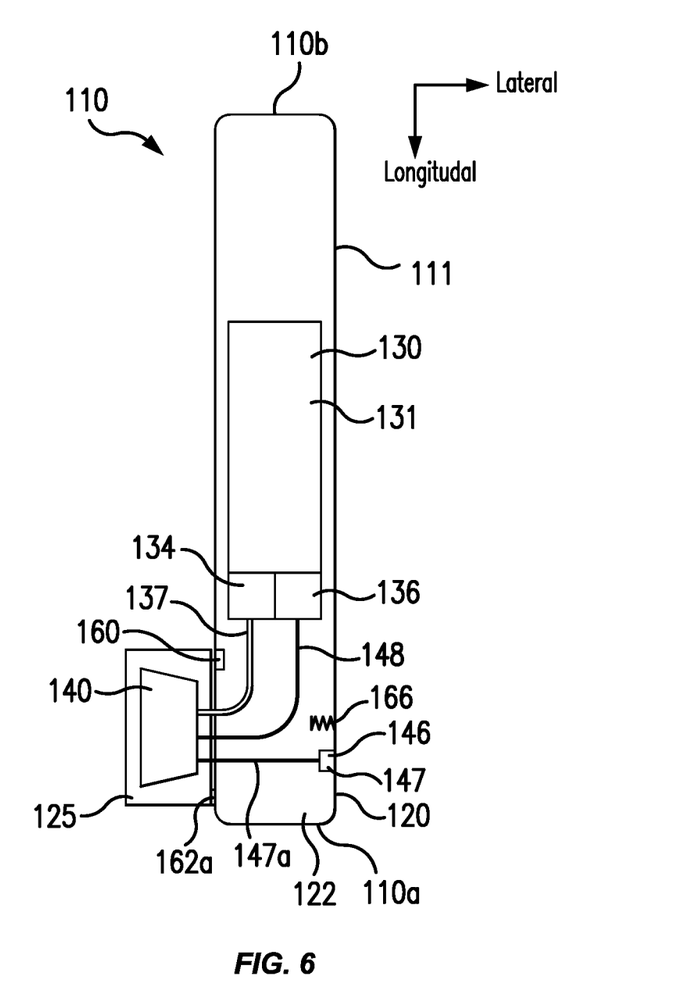
FIG. 6 is a cross section of an armrest with a mask storage compartment in a deployed configuration according to aspects of the present disclosure.

An oxygen system 130 to deliver breathable oxygen to a user is shown in FIGS. 3, 4, and 6. Oxygen system 130 includes an oxygen source 131. In some aspects, oxygen source 131 is a compressed gas cylinder containing pressurized breathable oxygen gas. In other aspects, oxygen source 131 can be a chemical reaction oxygen generator that produces breathable oxygen gas through a chemical reaction. In some aspects, oxygen source 131 is configured to either contain or produce enough oxygen gas to meet a desired oxygen production standard. For example, in an aspect oxygen source 131 contains or can generate sufficient breathable oxygen gas to provide an adult passenger with oxygen gas for at least fifteen minutes. In an aspect, oxygen source 131 is a compressed gas cylinder that contains between three cubic feet and six cubic feet of oxygen gas when filled to a service pressure of up to 3000 psi. A pressure regulator 134 is connected to oxygen source 131 and regulates the oxygen output from oxygen source 131 to a suitable pressure. Pressure regulator 134 can include an overpressure protection device, such as a burst disk, to protect oxygen system 130 from excess oxygen pressure from oxygen source 131. In an aspect, pressure regulator 134 is configured to deliver oxygen at a rate of one liter of oxygen per minute per 10,000 feet of altitude.

Figure 9:
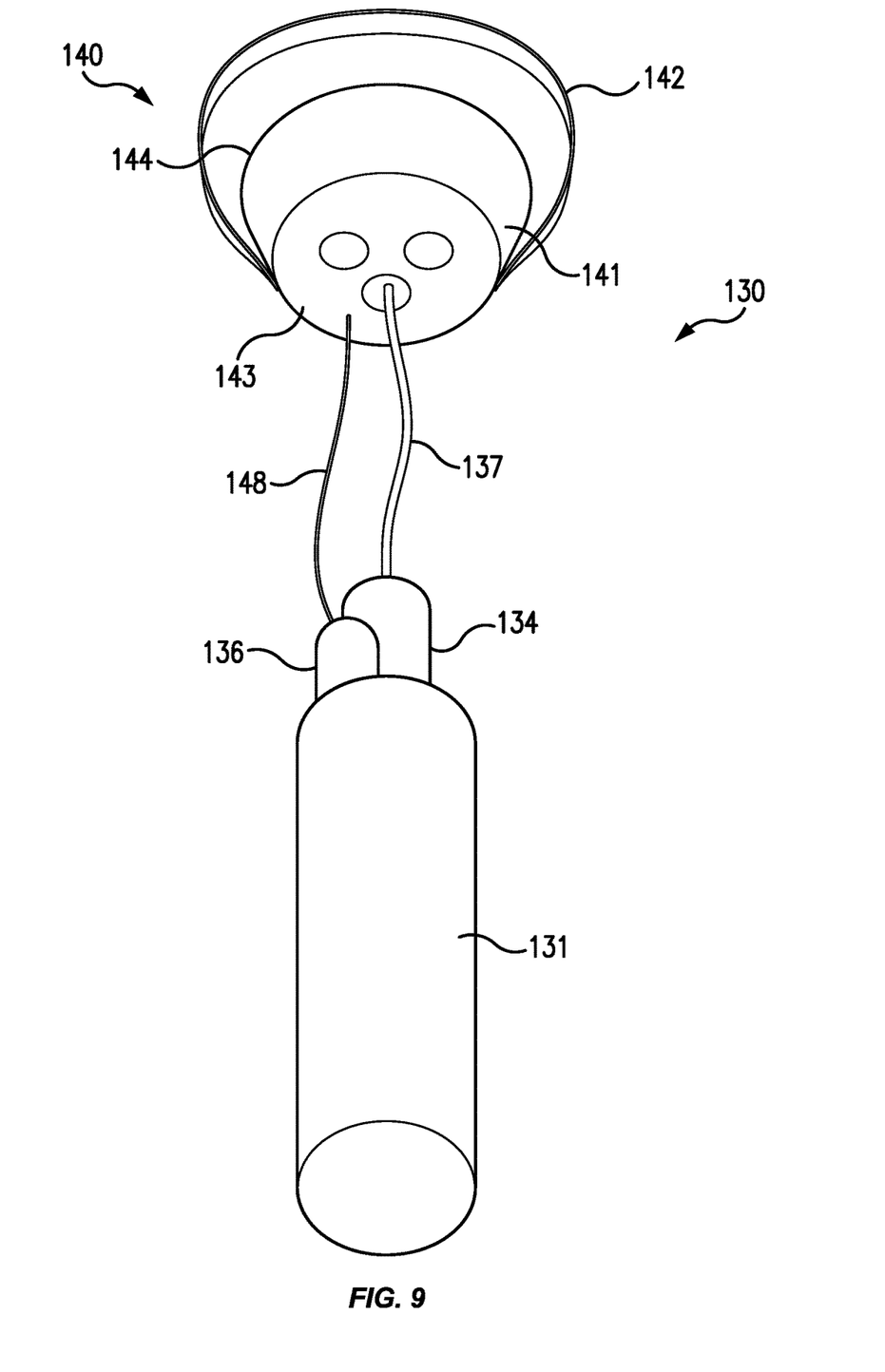
FIG. 9 is a view of an oxygen system according to aspects of the present disclosure.

As seen in FIGS. 5 and 9, a mask 140 is fluidly connected to pressure regulator 134 by tubing 137. Tubing 137 can be any suitable tubing that is capable of fluidly connecting mask 140 to oxygen source 131 and pressure regulator 134 to deliver the regulated breathable oxygen output from pressure regulator 134 to mask 140. Mask 140 includes a mask body 141 that is configured to fit over the face of a user to deliver the oxygen to the user's mouth and nose. Mask 140 also includes a strap 142 connected to mask body 141 that is designed to retain mask 140 on the user's face by passing around the back of the user's head. In some aspects, strap 142 is formed from an elastic material that can stretch over the user's head.

Mask body 141 is configured to fit over the face of a user to supply oxygen to the user. In an aspect, mask body 141 is formed as a cylinder with an open end 144 that is placed on the user's face. Closed end 143 of mask body 141 forms an enclosed space over the user's face that is supplied with oxygen through tubing 137. In these aspects, mask body 141 can be formed of a suitable material such as a plastic or composite material. Mask body 141 can include sealing elements disposed on or near open end 144 to improve the seal between mask body 141 and the user's face.

In some aspects, mask body 141 is collapsible to reduce the storage volume required to store mask 140. For example, in an aspect mask body 141 is formed from concentric cylindrical sections that can slide together to nest into each other, thereby reducing the size of mask 140. In another aspect, mask body 141 is formed from an elastic material that allows mask body 141 to be collapsed into itself. When these aspects of mask body 141 are unrestrained they revert back to their original form as discussed in the preceding sections.

As seen in FIG. 4, another element of oxygen system 130 is activation device 136. Activation device 136 functions to control the flow of oxygen from oxygen source 131 to mask 140. Activation device 136 can be physically connected to mask 140 such that movement of mask 140 a certain distance away from activation device 136 will activate oxygen flow to mask 140 from oxygen source 131. In aspects like those shown in FIG. 4, this connection can be accomplished by a cord 148 that connects mask body 141 and activation device 136. In an aspect, activation device 136 comprises a valve that is connected to cord 148. The valve can be a ball valve that can be rotated into the open or closed position by a lever mounted externally on the valve. Movement of cord 148 activates the valve by, moving the lever that controls the valve. This movement allows oxygen to flow through the opened valve. In other aspects, activation device 136 comprises a diaphragm that is pierced by a spring-loaded pin that is activated by movement of cord 148. The size of the opening that is created in the diaphragm can be designed to regulate the oxygen flow to mask 140.

As shown in FIGS. 3 and 4, oxygen system 130 can be integrated into a cavity 116 formed in an interior of armrest 110. Specifically, oxygen source 131, pressure regulator 134, and activation device 136 can be packaged into a form factor that fits into cavity 116. These elements can be removably retained in cavity 116 by suitable retention elements such as straps, clamps, or brackets. In an aspect, these elements are retained in cavity 116, which can be formed to receive these elements by a press fit or a snap fit into the structure of cavity 116. In some aspects, oxygen source 131 can be accessed by removing either armrest cover 112 (in aspects with a removable armrest cover 112) or through an access port 118 (FIG. 2) disposed in armrest 110. This ensures that oxygen system 130 is easily accessible for service or maintenance.

As shown in FIG. 3, tubing 137 and cord 148 are placed in cavity 116 into mask storage compartment 120, which contains mask 140. As discussed above, mask storage compartment 120 is formed at distal end 110a of armrest 110, and thus mask 140 is disposed at the distal end of armrest 110 when it is stored. In aspects of mask 140 that have a collapsible mask body 141, mask storage compartment 120 can be made thinner with respect to the axial length of housing 122 (in the lateral direction) because mask body 141 can be collapsed. This can be desirable to minimize the volume of mask storage compartment 120.

A deployment system 160 controls the movement and deployment of mask 140 from a storage position entirely inside mask storage compartment 120 to a deployed position where mask 140 is at least partially outside mark storage compartment 120. In an aspect, deployment system 160, which is shown in FIGS. 3-5, deploys mask 140 through a door 124 of housing 122 that is connected via a hinge 162 to the remaining portion of housing 122 (and, thus, to armrest 110). The aspect of door 124 open away from armrest 110 (i.e., in the positive longitudinal direction) by rotating about hinge 162. As seen in FIGS. 4 and 5, after opening the curved section of door 124 can cradle mask 140 and present it a user for use.

This aspect of deployment system 160 may include an opening actuator 164 that holds door 124 closed. For example, opening actuator 164 may be an electromagnet that can be switched on or off to hold door 124 closed or open, respectively. In other aspects, actuator 164 could be a linear actuator that physically moves a latch or lever to open door 124. As shown in FIGS. 4 and 5, opening actuator 164 can be disposed on the upper interior surface of housing 122 where door 124 meets housing 122. Hinge 162 may include a spring 162a that biases door 124 open. Thus, when actuator 164 actuates to open door 124, spring 162a in hinge 162 forces door 124 open, presenting mask 140 for use.

Opening actuator 164 can be controlled by a signal received through a wire 165. The signal transmitted by wire 165 can be sent manually by the aircraft crew (e.g., by actuation of a switch). The signal to deploy mask 140 can also be sent automatically based on a drop in cabin pressure. As seen in FIGS. 3 and 4, wire 165 can pass through armrest 110 to connection 114, where it can connect to the main aircraft control systems. In aspects of connection 114 that are hinged, wire 165 may have sufficient slack to accommodate the rotation of the hinged connection 114. In other aspects of connection 114 that are hinged, the center of connection 114 may be hollow, allowing wire 165 to pass through to seat frame 102. In an aspect, connection 114 can include a slip ring electrical connection across hinged connection 114 that enables signals to pass to wire 165.

As shown in FIG. 5, in an aspect, deployment system 160 includes a mask deployment mechanism 166 disposed inside mask storage compartment 120. Mask deployment mechanism 166 provides a force that moves mask 140 further into the deployed position that is outward and away from armrest 110 (and, therefore, mask storage compartment 120) after mask 140 is deployed. This can improves accessibility of mask 140 by increasing the protrusion of mask 140 from the structure of armrest 110, which can make it easier for a user to grasp mask 140. In an aspect, mask deployment mechanism 166 is a spring that has an end 166a fixed to an inner wall of either armrest 110 or mask storage compartment 120 by a suitable fixing method such as adhesives, welding, or fasteners. The spring is positioned such that its other end 166b is compressed against a portion of mask 140 when mask 140 is loaded into mask storage compartment 120. When deployment system 160 activates, the spring provides a force that moves mask 140 away from armrest 110 as the spring relaxes. Another aspect of mask deployment mechanism 166 can include tabs or levers formed from an elastically deformable material (e.g., rubber or foam) that are fixed to an inner surface of armrest 110 or mask storage compartment 120. Similar to the spring discussed above, these deformable elements are compressed against mask 140 when mask 140 is loaded into mask storage compartment 120. They function in a similar manner as the spring-based aspects of mask deployment mechanism 166 when opening 124 is opened.

Also shown in FIGS. 4 and 5 is a retractor 146. Retractor 146 connects mask 140 to passenger armrest 110 in a retractable manner such that mask 140 is biased towards mask storage compartment 120 after mask 140 is deployed. In some aspects retractor 146 comprises an elastic cord 147 that is fixed at one end to an interior of either passenger armrest 110 or mask storage compartment 120 by a suitable fixing method such as adhesives or welding. The other end of the elastic cord is fixed to mask body 141 by, for example, formation of a loop in the elastic cord that is attached to mask body 141. The elastic cord can elastically stretch to allow mask 140 to be worn by the user, but then to return to its original, un-stretched configuration when mask 140 is released, which draws mask 140 back towards mask storage compartment 120. Another aspect of retractor 146 can be a spring-loaded cable reel 147 that is fixed to an interior of mask storage compartment 120 or armrest 110 by a suitable fixing method such as adhesives or welding. Cable 147a of cable reel 147 is fixed to mask body 141 by looping cable 147a through a part of mask body 141 or by any other suitable technique. Reel 147 is spring loaded to retract cable 147a, and is unwound when mask 140 is accessed by the user. When the user releases mask 140, reel 147 winds in cable 147a and draws mask 140 back towards mask storage compartment 120. The addition of retractor 146, which can be added to any aspects of passenger armrest 110 discussed here, improves system safety and performance because retracting mask 140 after the user releases it improves emergency egress access and also reduces tripping or entanglement hazards caused by unused mask 140 hanging from armrest 110.

Another aspect of mask deployment mechanism 160 is shown in FIG. 6. This aspect includes a door 125 disposed in a side of mask storage compartment 120. As shown in FIG. 6, in an aspect door 125 can be disposed on a side of passenger armrest 110. For example, door 125 can be on a side that faces the seating area of passenger seat 100. This can improve access to mask 140 when door 125 is opened. Door 125 can also be positioned on a top side, bottom side, or either lateral side of mask storage compartment 120 as desired. Door 125 can be held closed by an actuator 164a that is identical to the actuator 164 discussed above. Further, door 125 can also include a hinge 162a that joins door 125 to mask storage compartment 120. Like hinge 162 discussed above, hinge 162a can include a spring that biases door 125 open. This aspect of mask deployment mechanism 160 can be triggered to deploy mask 140 in the same manner as is discussed above.

Figure 7:
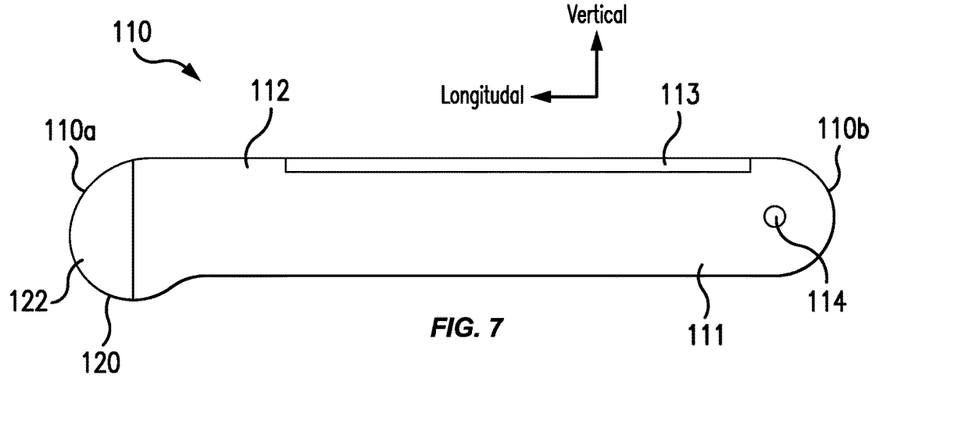
FIG. 7 is a side view of an armrest according to aspects of the present disclosure.
Figure 8:
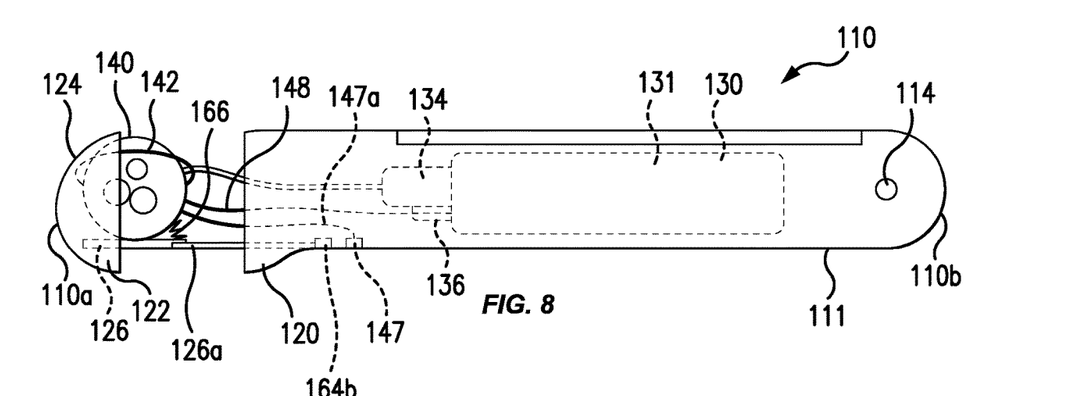
FIG. 8 is a side view of the armrest of FIG. 7 in a deployed configuration according to aspects of the present disclosure.

Another aspect of mask deployment mechanism 160 is shown in FIGS. 7 and 8. This aspect includes a deployment tray 126 that holds mask 140 inside mask storage compartment 120. As shown in FIG. 8, deployment tray 126 cradles mask 140. Deployment tray 126 can be mounted on rails 126a on armrest 110. Deployment tray 126 can slide outward (longitudinally forward) from armrest 110 to deploy mask 140 from the stowed position to the deployed position. In the aspect shown in FIGS. 7 and 8, deployment tray 126 includes the distally forward portion of mask storage compartment 120 (including distal end 110a). However, another aspect of deployment tray 126 can include only the structure necessary to cradle mask 140 and not include any portion of mask storage compartment 120. This aspect can be deployed through an opening in mask storage compartment 120. In an aspect, deployment tray 126 can be actuated into the deployed position by springs that bias deployment tray outward along rails 126a. When it is necessary to deploy mask 140, an actuator 164b releases deployment tray 126, and the springs push deployment tray 126 outward on rails 126a. Actuator 164b can be similar to actuator 164 discussed above, and can be activated by a signal from wire 165. In another aspect, deployment tray 126 can be actuated into the deployed position by a linear actuator 164b connected directly to deployment tray 126. When a signal is received, linear actuator 164b moves deployment tray 126 into the deployed position. This aspect of linear actuator 164b can be electrically powered or can be hydraulically operated.

As explained above, aspects of armrest 110 are removably connected to seat back 104 through connection 114. This allows armrest 110 to be a modular element that can be quickly removed and replaced on a given passenger seat 100, which can improve maintenance and repair functionality. This modular design also enables the ability to retrofit armrest 110 into existing passenger seats 100 by ensuring that connection 114 is compatible with existing passenger seats 100.

Aspects of the various features discussed above can be combined with other aspects as needed to achieve the desired features and benefits of the armrest oxygen system. For example, the various aspects of deployment system 160 can be combined with any aspect of armrest 110 to match the design requirements of a particular installation of armrest 110.

It is to be appreciated that the Detailed Description section, and not the Brief Summary and Abstract sections, is intended to be used to interpret the claims. The Summary and Abstract sections may set forth one or more but not all aspects of the support assembly system and apparatus, and thus, are not intended to limit the present aspects and the appended claims.

The foregoing description of the specific aspects will so fully reveal the general nature of the disclosure that others can, by applying knowledge within the skill of the art, readily modify and/or adapt for various applications such specific aspects, without undue experimentation, without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary aspects, but should be defined only in accordance with the following claims and their equivalents.

What is claimed is:

1. An armrest for an airplane passenger seat, comprising:
   an armrest frame connected to the airplane passenger seat at a first end of the armrest frame having a cavity in its interior area;
   a mask storage compartment coupled to the armrest frame;
   an oxygen source in the cavity; and
   an oxygen mask positioned in the mask storage compartment, wherein the oxygen mask is fluidly connected to the oxygen source, and
   an actuator disposed in the armrest to deploy the oxygen mask to extend from the armrest frame.

2. The armrest of claim 1, further comprising a door that is connected to the mask storage compartment through a hinge, wherein the actuator opens the door when it deploys the oxygen mask.

3. The armrest of claim 2, wherein the hinge comprises a spring that biases the removable portion to an open position.

4. The armrest of claim 2, wherein the door is disposed at an end of the armrest opposite the first end of the armrest.

5. The armrest of claim 2, wherein the door is disposed on a lateral side of the mask storage compartment.

6. The armrest of claim 2, wherein the door is disposed on a top of the mask storage compartment.

7. The armrest of claim 1, further comprising a retractor fixed to an interior of the armrest and connected to the oxygen mask, wherein the retractor biases the mask towards the mask storage compartment after it has been removed from the mask storage compartment.

8. The armrest of claim 1, further comprising a mask deployment mechanism disposed in the mask storage compartment to push the mask out of the mask storage compartment.

9. The armrest of claim 8, wherein the mask deployment mechanism comprises a spring that is fixed at one end of the spring to an interior of the mask storage compartment and that is in a compressed state with a second end of the spring in contact with the oxygen mask when the mask is in the mask storage compartment.

10. The armrest of claim 1, further comprising an activation device that is connected to the oxygen mask, wherein the activation device is activated by movement of the oxygen mask.

11. The armrest of claim 1, wherein the oxygen source comprises:
    a compressed gas cylinder configured to store pressurized oxygen; and
    a gas regulator attached to the compressed gas cylinder that is configured to regulate a supply of oxygen to the oxygen mask.

12. The armrest of claim 1, wherein the oxygen source comprises a chemical oxygen generator.

13. An armrest for a passenger seat of an airplane, comprising:
    an armrest frame removably connected to the passenger seat, the armrest frame having a cavity in its interior area;
    an oxygen source disposed in the cavity in the armrest;
    a mask storage compartment attached to a first end of the armrest;
    an oxygen mask in the mask storage compartment, wherein the oxygen mask is fluidly connected to the oxygen source with tubing;
    an activation device connected to the oxygen source and to the oxygen mask that activates a flow of oxygen to the oxygen mask when the mask is moved from the mask storage compartment; and
    an actuator disposed in the armrest to deploy the oxygen mask from the mask storage compartment.

14. The armrest of claim 13, further comprising a door that is connected to the mask storage compartment through a hinge, wherein the actuator releases the door when it deploys the oxygen mask, and wherein the hinge comprises a spring that biases the door to an open position.

15. The armrest of claim 13, further comprising a deployment tray disposed inside the mask storage compartment and configured to receive the mask, the deployment tray slidably disposed on a rail that extends in the longitudinal direction, wherein the deployment mechanism deploys the mask by sliding the deployment tray to along the rail beyond the first end of the armrest.

16. The armrest of claim 13, further comprising a retractor fixed to an interior of the armrest and connected to the oxygen mask, wherein the retractor biases the mask towards the mask storage compartment after it has been removed from the mask storage compartment.

17. The armrest of claim 13, wherein the mask deployment mechanism comprises a spring that is fixed at one end of the spring to an interior of the mask storage compartment and that is in a compressed state with a second end of the spring in contact with the oxygen mask when the mask is in the mask storage compartment.

18. The armrest of claim 13, wherein the oxygen source comprises:
    a compressed gas cylinder configured to store pressurized oxygen; and
    a gas regulator attached to the compressed gas cylinder and that configured to regulate a supply of oxygen to the oxygen mask.

19. The armrest of claim 13, wherein the oxygen source comprises a chemical oxygen generator.

* * * * *